US008218160B2

(12) United States Patent
Ferlitsch

(10) Patent No.: US 8,218,160 B2
(45) Date of Patent: Jul. 10, 2012

(54) ADAPTIVE AUTOMATIC PRINTING

(75) Inventor: Andrew Rodney Ferlitsch, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1201 days.

(21) Appl. No.: 11/890,952

(22) Filed: Aug. 8, 2007

(65) Prior Publication Data

US 2009/0040547 A1 Feb. 12, 2009

(51) Int. Cl.
*G06K 1/00* (2006.01)

(52) U.S. Cl. ....... 358/1.13; 358/1.9; 358/1.16; 358/1.15

(58) Field of Classification Search ........................ None
See application file for complete search history.

(56) References Cited

U.S. PATENT DOCUMENTS

| | | | | |
|---|---|---|---|---|
| 5,400,243 | A | 3/1995 | Oheda et al. | 715/531 |
| 5,684,602 | A | 11/1997 | Tsuchiya et al. | 358/404 |
| 5,982,994 | A * | 11/1999 | Mori et al. | 358/1.15 |
| 6,293,657 | B1 | 9/2001 | Garcia et al. | 347/84 |
| 6,421,135 | B1 | 7/2002 | Fresk et al. | 358/1.15 |
| 6,491,453 | B1 | 12/2002 | Fukano et al. | 400/76 |
| 6,958,822 | B2 | 10/2005 | Lester et al. | 358/1.14 |
| 2002/0105669 | A1 | 8/2002 | Watanabe et al. | 358/1.14 |
| 2005/0105117 | A1 | 5/2005 | Oh et al. | 358/1.13 |
| 2005/0111028 | A1 * | 5/2005 | Kim | 358/1.14 |
| 2005/0238401 | A1 | 10/2005 | Yamada et al. | 400/78 |

FOREIGN PATENT DOCUMENTS

| | | |
|---|---|---|
| EP | 0478965 | 1/1998 |
| JP | 6035903 | 2/1994 |
| JP | 9146965 | 6/1997 |
| JP | 2004021458 | 1/2004 |
| JP | 2004/255745 | 9/2004 |
| JP | 2008/040841 | 2/2008 |

* cited by examiner

*Primary Examiner* — Twyler Haskins
*Assistant Examiner* — Lennin Rodriguez
(74) *Attorney, Agent, or Firm* — Scot A. Reader

(57) ABSTRACT

Adaptive automatic printing methods and systems allow a user to modify print settings for an automatic print job after sending the job, after which the job is output under the modified print settings without any requirement to resend the job. Accordingly, if a user discovers after sending an automatic print job that an improper or suboptimal print setting has been used, the user can correct the problem without having to resend the job and, in some embodiments, without having to return to the client node.

11 Claims, 5 Drawing Sheets

GENERATE PRE-RASTER PRINT DATA 410
RASTERIZE PRE-RASTER PRINT DATA 420
CACHE/UPDATE PRE-RASTER PRINT DATA, RASTER IMAGES, JOB DATA STRUCTURE, AS REQUIRED 430
BEGIN/RESUME PRINTING 440
INTERRUPT
SUSPEND PRINTING 450
SETTING CHANGE
CANCEL PRINT JOB 460
POST-RASTER SETTING CHANGE
NO SETTING CHANGE
PRE-RASTER SETTING CHANGE

CLIENT NODE 110

COMMUNICATION NETWORK 120

PRINTING NODE 130

GENERATE PRE-RASTER PRINT DATA 510
RASTERIZE PRE-RASTER PRINT DATA 520

CACHE/UPDATE RASTER IMAGES, JOB DATA STRUCTURE, AS REQUIRED 530
BEGIN/RESUME PRINTING 540
NO SETTING CHANGE
INTERRUPT
SUSPEND PRINTING 550
POST-RASTER SETTING CHANGE
CANCEL PRINT JOB 560

ADAPTIVE AUTOMATIC PRINTING

BACKGROUND OF THE INVENTION

The present invention relates to computerized imaging and, more particularly, to a method and system that allows a user to modify a print job that has been sent from a client node to a printing node for automatic printing.

Most print jobs initiated by a user on a client node are sent to a printing node for automatic printing. Automatic print jobs are printed on the printing node as soon as a scheduled time arrives and without a requirement of further user intervention. If a user discovers after sending an automatic print job (for example, after reviewing the first few pages of the print job that have been output on the printing node) that an improper or suboptimal print setting has been applied, the user must generally return to the client node, modify the problem print setting and resubmit the job. The requirement to return to the client node for corrective action consumes the user's valuable time, while the requirement to resend the job can impose additional delays since the resent job must be rescheduled.

Some printing nodes support a filing feature in which print jobs initiated on a client node are rasterized and filed on a printing node for later printing. Filed print jobs are not printed without further user intervention, but rather must be recalled by the user. Upon recall but before printing, some filing features allow the user to modify a limited number of print settings that do not require the filed job to be re-rasterized, such as pagination, paper size/stock, sheet assembly, tray and finishing options. For example, some filing features present the pages of the filed job as thumbnail images on a user interface of the printing node and allow the user to identify individual pages for printing by selecting among the thumbnail images.

Unfortunately, to utilize the print setting modification functions of filing features, a user must have had the foresight to file the print job in the first place. Normally, a user does not think at the time a print job is sent from the client node that filing will be necessary since he or she usually only learns of a problem print setting after sending the job. Thus, even where a filing feature is supported, the vast majority of print jobs are sent for automatic printing. The utility of filing features has been further limited by a general lack of support for modification of print settings that would require the filed job to be re-rasterized.

SUMMARY OF THE INVENTION

The present invention, in a basic feature, provides adaptive automatic printing. Adaptive automatic printing, generally speaking, allows a user to modify print settings for an automatic print job after sending the job, after which the job is output under the modified print settings without any requirement to resend the job. Accordingly, if a user discovers after sending an automatic print job that an improper or suboptimal print setting has been used, the user can correct the problem without having to resend the job and, in some embodiments, without having to return to the client node. Filing of a print job is removed as a predicate to correcting print settings. Moreover, in a departure from known filing features, in some embodiments of the present invention even print settings that require a print job to be re-rasterized can be modified.

In one aspect, the present invention provides a printing node comprising a network interface, a memory and a processor communicatively coupled with the network interface and the memory, wherein data for a print job received on the printing node via the network interface are retained in the memory at least while the print job is being output, and wherein at least part of the data are updated under control of the processor in response to a change to a print setting made by a user after output of the print job has been started, whereafter output of the print job is restarted under control of the processor in accordance with the data.

In some embodiments, output of the print job is temporarily suspended under control of the processor in response to an interrupt indication that precedes the change and the print job is cancelled and restarted under processor control in response to the change.

In some embodiments, the interrupt indication and the change are received on a user interface of the printing node or on the network interface.

In some embodiments, the data for the print job comprise page description language (PDL) data and job structure data; display list (DL) data and job structure data; device independent bitmap data and job structure data; or raster images and job structure data.

In some embodiments, the change comprises a change to a pre-raster print setting, such as bit depth, black-and-white conversion, color management, half-toning, image quality, page orientation, page scaling, resolution, toner saving or under color removal (UCR); or to a post-raster print setting, such as collation, number of copies, duplex mode, folding, hole punching, page order, page selection, paper size, paper stock, sheet insertion, stapling or troy selection.

In another aspect, a printing method comprises the steps of receiving on a printing node from a client node a print job, storing on the printing node data for the print job, starting on the printing node output of the print job, receiving on the printing node via a user input on the printing node a change to a print setting for the print job after starting output of the print job, updating on the printing node at least part of the data in response to the change and restarting on the printing node output of the print job in accordance with the data.

In yet another aspect, a printing method comprises the steps of receiving a print job, storing data for the print job, starting output of the print job, receiving an interrupt indication while outputting the print job, temporarily suspending output of the print job for a specified time period in response to the interrupt indication, canceling the print job in response to a resume indication coupled with a change to a setting for the print job within the specified time period or expiration of the specified time period, whichever occurs first; and, in the event the print job is canceled in response to a resume indication coupled with a change to a setting for the print job within the specified time period: updating at least part of the data in response to the change and restarting output of the print job in accordance with the data.

These and other aspects of the invention will be better understood by reference to the following detailed description taken in conjunction with the drawings that are briefly described below. Of course, the invention is defined by the appended claims.

DETAILED DESCRIPTION OF A PREFERRED EMBODIMENT

Figures 1, 2:
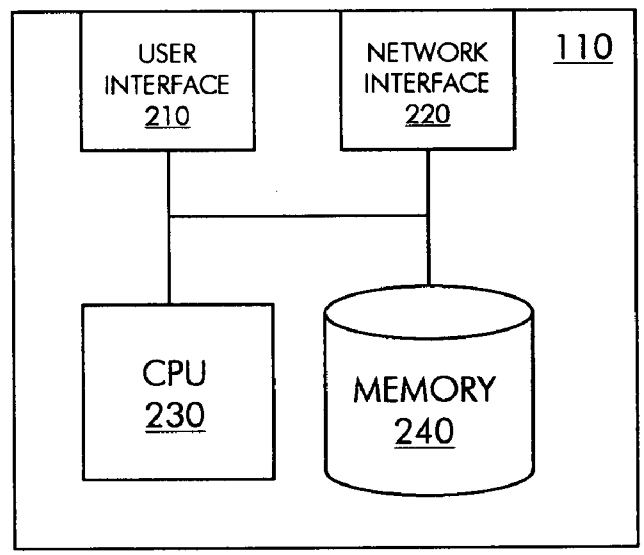
FIG. 1 shows a printing system in which the invention is operative in some embodiments of the invention.
FIG. 2 shows a client node in the printing system of FIG. 1 in more detail.

In FIG. 1, a printing system is shown in which adaptive automatic printing methods and systems are operative in some embodiments of the invention. The printing system includes a client node 110 communicatively coupled with a printing node 130 over a communication network 120. Client node 110 is a data communication device, such as a desktop personal computer, laptop personal computer, workstation, remote terminal, cellular phone or personal data assistant (PDA), that is capable of receiving on a user interface specifications for an automatic print job and generating and transmitting via a network interface, such as an Ethernet interface or a universal serial bus (USB) interface, an automatic print job conformant with the specifications for printing on printing node 130. Communication network 120 may be a point-to-point connection, such as a wired or wireless Ethernet link or a USB link, or a data communication network that includes one or more LANs, WANs, WiMax networks and/or ad-hoc networks each having one or more data communication nodes, such as switches and routers, that operate to communicatively couple client node 110 and printing node 130. In some embodiments, communication network 120 traverses the Internet. In some embodiments, communication network 120 includes one or more print server nodes that act as intermediaries between client node 110 and printing node 130. Printing node 130 is a printing device having a network interface, such as an Ethernet interface or USB interface, that is capable of receiving via a network interface an automatic print job initiated on client node 110, processing the print job and outputting a hard copy of the print job without any further requirement of user intervention. Of course, while further user intervention is not required in automatic printing, in accordance with the principles of the present invention, user intervention occurs to advantageously change undesirable print settings as explained herein.

In FIG. 2, client node 110 is shown in more detail. Client node 110 has a user interface 210, a network interface 220 and a memory 240 communicatively coupled with a processor (CPU) 230. User interface 210 has an input mechanism, such as a keyboard, keypad or touch-sensitive navigation tool for accepting inputs from a user and an output mechanism, such as a liquid crystal display (LCD), a light emitting diode (LED) display or cathode ray tube (CRT) for displaying outputs to a user. Network interface 220 is a wired or wireless data communication interface, such as an Ethernet interface or a USB interface, that communicatively couples client node 110 to communication network 120. Memory 240 includes one or more random access memories (RAM), one or more read only memories (ROM). An operating system installed in memory 240 and executed by processor 230 manages operations on client node 110 by creating, scheduling and performing various tasks, among them generating source files for automatic print jobs conformant with print job specifications input on user interface 310 and transmitting the source files on network interface 220. The source files include instructions instructing how text and graphics are to be printed on a page as well as user-selected print settings. In some embodiments, tasks also include processing interrupt indications and print setting modifications input on user interface 210 and transmitting such indications and modifications to printing node 130.

Figure 3:
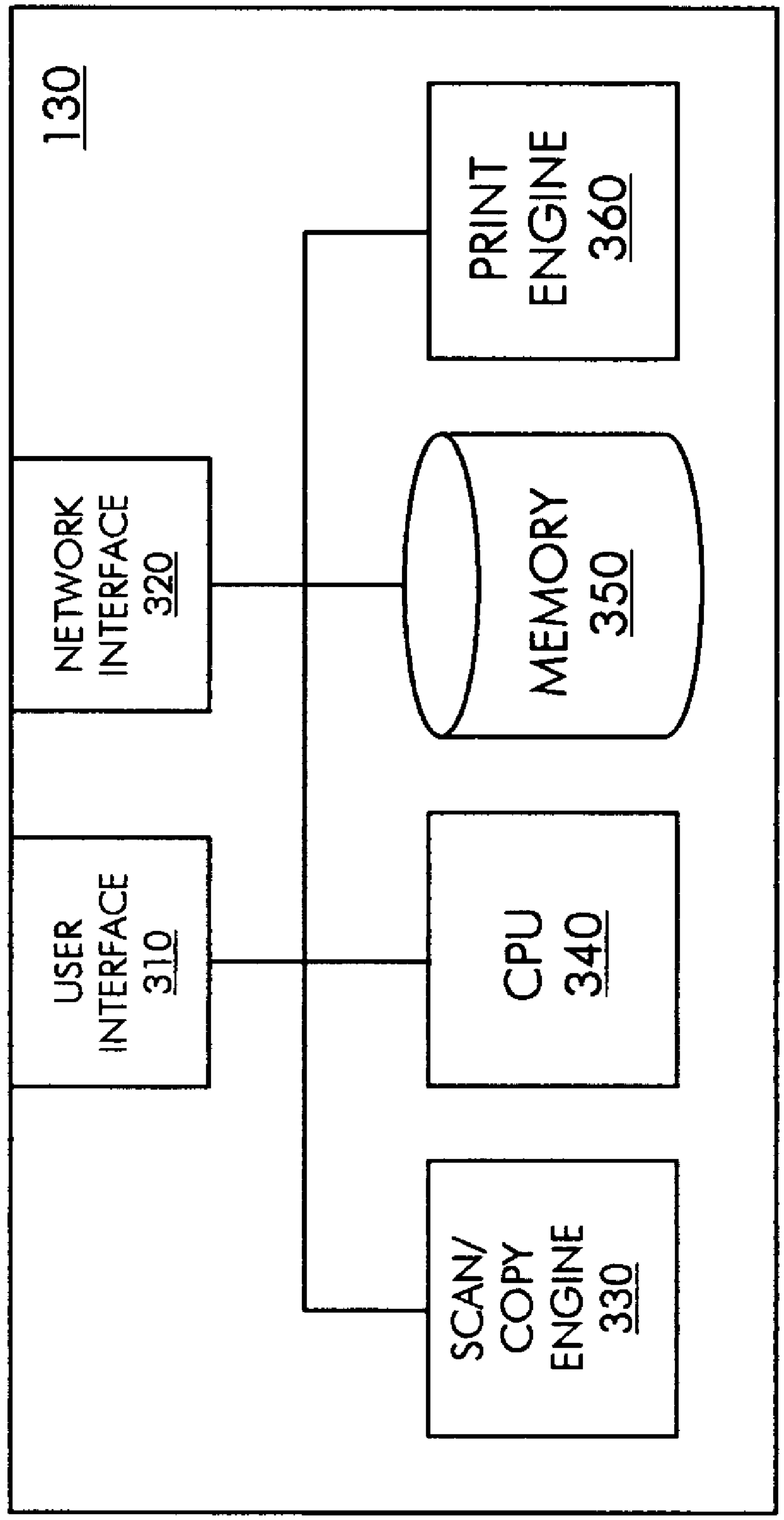
FIG. 3 shows a printing node in the printing system of FIG. 1 in more detail.

In FIG. 3, printing node 130 is shown in more detail. Printing node 130 is a multifunction printer (MFP) that supports multiple imaging functions, such as printing, scanning and copying. In some embodiments, MFP also supports filing or foxing, or both. Printing node 130 has a user interface 310 including a front panel for accepting inputs from a user and displaying output to a user. Printing node 130 also has a network interface 320. Network interface 320 is a wired or wireless data communication interface, such as an Ethernet interface or a USB interface, that communicatively couples printing node 130 to communication network 120. Internal to printing node 130, interfaces 310, 320 are communicatively coupled with a processor (CPU) 340, a memory 350 a scan/copy engine 330 and a print engine 360. Scan/copy engine 330 includes scanner/copier logic, such as one or more integrated circuits (ICs), and a mechanical section for performing a scanning and copying functions. For example, scan/copy engine 330 may have a line image sensor mounted on a movable carriage for optically scanning a document under the control of a scanner IC and storing the scanned document into memory 350. Print engine 360 includes printer logic, such as one or more ICs, and a mechanical section for performing printing functions. For example, print engine 360 may have a color ink jet head mounted on a movable carriage for printing a document under the control of a printer IC. While in the illustrated embodiments a printing node 130 that supports scanning, copying and printing is shown, in other embodiments of the invention an MFP or single-function printing device without scanning or copying capabilities may be employed.

Continuing with FIG. 3, memory 350 includes RAM and ROM, which may include one or more flash memories. An operating system installed in memory 350 and executed by processor 340 manages operations on printing node 130 by creating, scheduling and performing various printing, scanning, copying, spooling, diagnostic and other tasks. Tasks that are performed attendant to adaptive automatic printing include print data generation, print data rasterization, print job data caching, commencement of printing, suspension of printing, print job data updating and print job cancellation. Print data generation, print job data caching and commencement of printing are prompted by receipt on network interface 320 of a source file for an automatic print job. Suspension of printing, print job updating and print job cancellation are prompted by interrupt indications and print setting modifications received in response to inputs, in some embodiments, on user interface 210 of client node 110 and, in some embodiments, on user interface 310 of printing node 130.

In operation, a user of client node 110 initiates an automatic print job by selecting on user interface 210 a document or image to be printed and print settings. In some embodiments, the user selects from among numerous print settings displayed on user screens. Once the user has finished selecting print settings for the print job on user interface 210 and has provided an instruction to print, processor 230 generates a source file for the print job and transmits the source file to printing node 130 via network interface 220. In some embodiments, the source file provides instruction on how text and graphics are to be printed on each page of the print job as well as the user-selected print settings.

Figure 4:
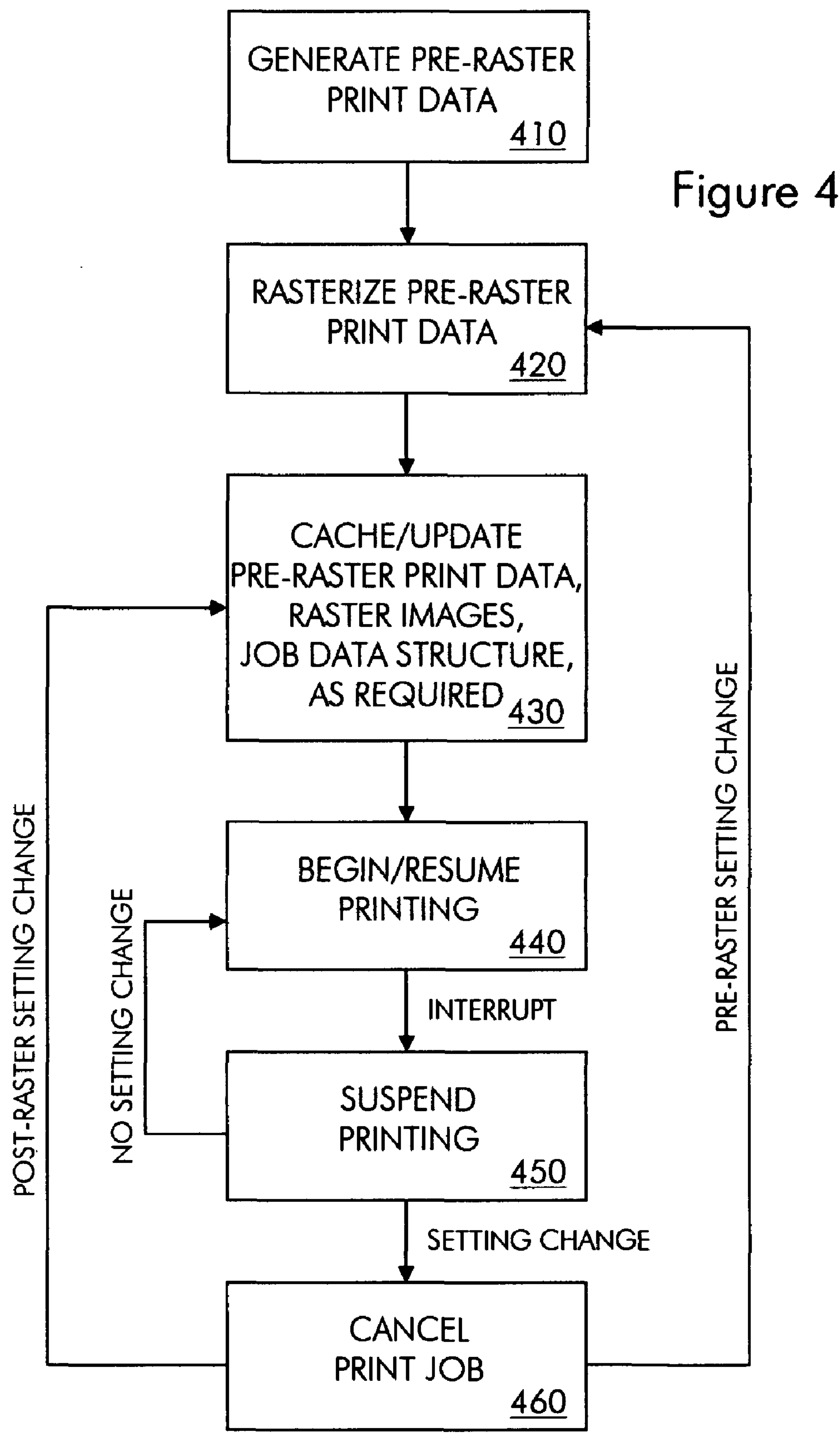
FIG. 4 shows an adaptive automatic printing method in which pre- and post-raster print settings may be changed in some embodiments of the invention.

Turning now to FIG. 4, tasks performed on printing node 130 upon receiving a source file for an automatic print job initiated on client node 110 are shown in some embodiments of the invention. In these embodiments, both pre- and post-raster print settings may be changed by the user without resending the print job. Pre-raster print settings are selections applied in converting print data into raster images, such as bit depth, black-and-white conversion, color management, half-toning, image quality, page orientation, page scaling, resolution, toner saving and UCR, for example. Post-raster print settings are selections applied in outputting of raster image pages, such as collation, number of copies, duplex mode, folding, hole punching, page order, page selection, paper size, paper stock, sheet insertion, stapling and input and output tray selection, for example.

Upon receiving the print job, processor 340 performs a print data generation task (410) which converts, to the extent necessary, the source file for the print job into pre-raster print data in a format supported by printing node 130. The pre-raster print data determines the appearance of all pages of the print job, but at a higher level than raster images that include an actual output bitmap. The pre-raster print data may include PDL data, DL data or device independent bitmap data, for example, and also includes job structure data. By way of example, the pre-raster print data may be formatted in one of Printer Command Language (PCL), PCL XL, Epson Standard Code for Printers (ESC/P), PostScript, Portable Document Format (PDF), Zoran Common Display List (CDL), Tagged Image File Format (TIFF), Joint Photographic Experts Group (JPEG), Portable Network Graphics (PNG), Exchangeable Image File Format (EXIF), Graphics Interchange Format (GIF), Microsoft Bitmap File Format (BMP) and Microsoft High Definition (HD) Photo format. The job structure data includes both pre-raster print settings and post-raster print settings.

Next, processor 340 performs a print data rasterization task, that is, raster image processing (RIP), which applies the pre-raster print settings and converts the pre-raster print data into raster images (420). Raster images include an actual output bitmap of all pages adopted for printing on printing node 130.

Next, processor 340 caches the pre-raster print data, current raster images and current job structure data for the print job in memory 350 (430). In other embodiments, instead of caching these data in memory 350, these data may be cached on an external device, such as a storage node located in communication network 120 or a removable storage device (e.g. USB thumbdrive) connected to printing node 130. In either event, these cached data are retained in original or updated form until output of the print job has been completed, and which time these data are purged, and the raster images and job data structure may be updated in response to changes to print settings received at any time before output of the print job has been completed.

Next, processor 340 downloads the raster images and the post-raster print settings to print engine 360 and outputting of the print job begins (440).

At that point, processor 340 awaits an interrupt indication. An interrupt indication may be initiated by a user input on user interface 310 of printing node 130 or a user input on user interface 210 of client node 110. In some embodiments, user interface 310 includes a front panel having a key that a user may depress to prompt an interrupt. In some embodiments, user interface 210 provides a user screen on which a user may prompt transmission of an interrupt command to processor 340 via network interface 320. Naturally, if an interrupt indication is not issued while a given print job is being output, the print job is allowed to complete without interruption.

If an interrupt indication is received, processor 340 causes output of the print job to be temporarily suspended (450). Processor 340 transmits an interrupt command to print engine 360 which prompts print engine 360 to temporarily stop output of the print job pending further instruction. Then, in some embodiments, a menu is displayed on user interface 310 of printing node 130 that allows a user to modify one or more print settings, which may include pre-raster print settings and post-raster print settings. In other embodiments, such a menu is displayed on user interface 210 of client node 110.

In some embodiments, the menu displays current print settings for the print job and provides user controls for changing one or more of the current print settings.

In some embodiments, the menu allows a user to select all pages, a range of pages or individual pages of the print job to which print settings are to be applied. The menu may, for example, show reduced or full views of raster images for each page of the print job that may be depressed to select the page.

At that point, processor 340 awaits a resume indication with or without print setting changes and corresponding page identifications. A resume indication may be initiated by a user input on user interface 310 of printing node 130 or a user input on user interface 210 of client node 110 after making zero or more print setting changes. In some embodiments, user interface 310 includes a front panel having a key that a user may depress to prompt resumption. In some embodiments, user interface 210 provides a user screen on which a user may prompt transmission of a resumption command to processor 340 via network interface 320.

If the resume indication is received without any print setting changes, processor 340 causes output of the print job to be resumed from where it left off (440). Processor 340 transmits a resume command to print engine 360 which prompts print engine 360 to resume output of the print job from the point at which it had been temporarily suspended.

If, however, the resume indication is received with print setting changes, processor 340 causes the print job to be cancelled (460). Processor 340 transmits a cancel command to print engine 360 which prompts print engine 360 to cancel the print job that had been temporarily suspended. Then, processor 340 determines whether the print setting changes include one or more pre-raster setting changes. If not, re-rasterization is not required. Processor 340 thus updates the job data structure retained in memory 350 with the new post-raster print settings (430) and the print job is restarted (440) under the new post-raster print settings regime. If, however, the print setting changes include one or more pre-raster setting changes, re-rasterization is required. Processor 340 thus re-rasterizes the pre-raster print data in conformance with the new pre-raster settings (420) and updates the raster images and job data structure retained in memory 350 (430) before restarting the print job (440) with the new raster images and under the new print settings regime. Print setting changes may be applied and re-rasterization and output may be performed for all or selected pages of a print job depending on user selections.

At that point, processor 340 awaits a further interrupt indication, if any.

Figure 5:
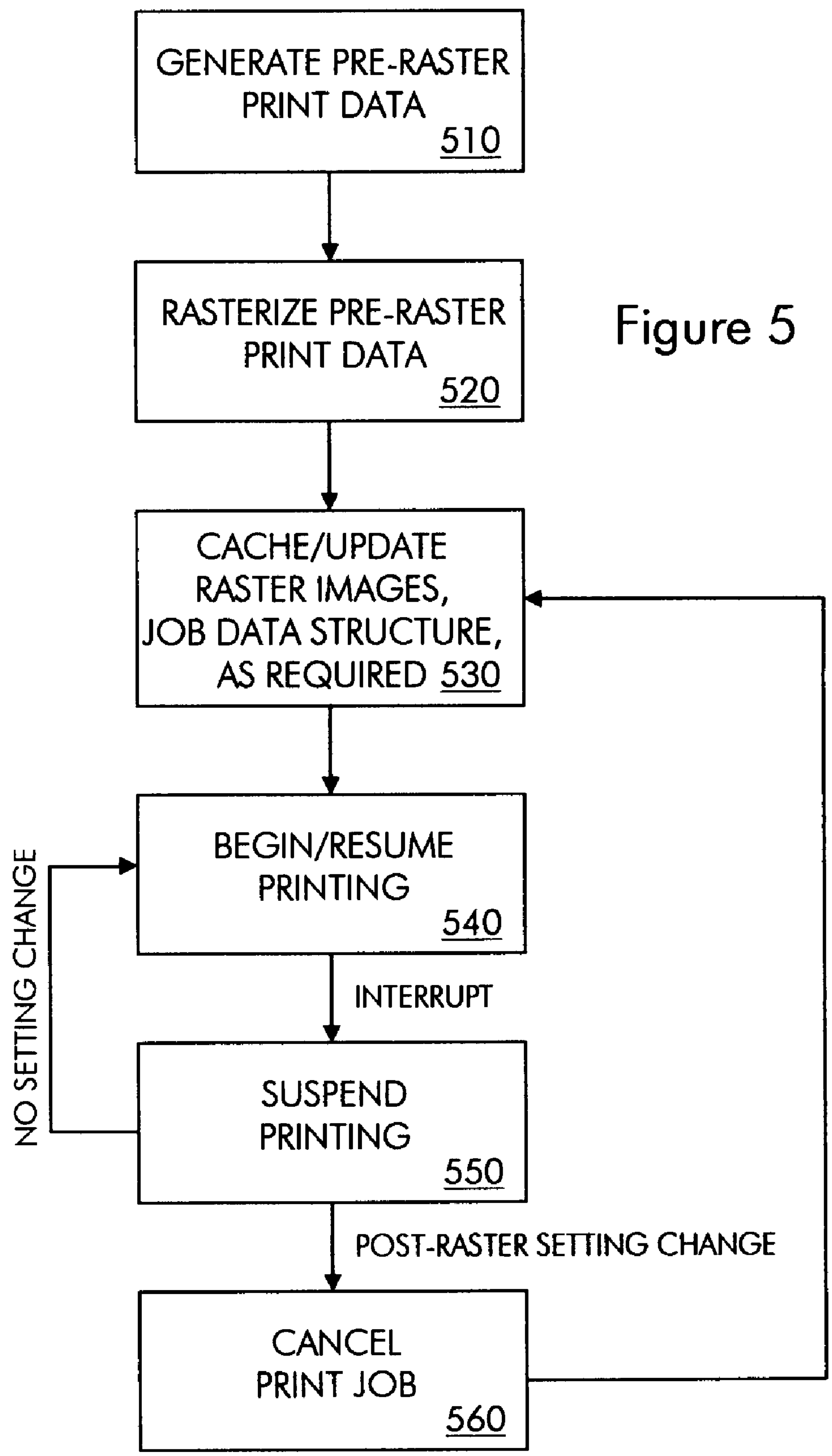
FIG. 5 shows an adaptive automatic printing method in which post-raster print settings may be changed in other embodiments of the invention.

Turning now to FIG. 5, an adaptive automatic printing method in which post-raster print settings may be changed is shown in other embodiments of the invention. In these embodiments, caching of pre-raster print data until the print job is completed is not required; however, only post-raster print settings can be modified.

Upon receiving the print job, processor 340 performs a print data generation task (510) which, to the extent necessary, converts the source file for the print job into pre-raster print data in a format supported by printing node 130. The pre-raster print data may be PDL data, DL data or device independent bitmap data, for example, and also includes job structure data. The job structure data includes both pre-raster and post-raster print settings. Next, processor 340 performs an RIP task which applies the pre-raster print settings and converts the pre-raster print data into raster images (520). Next, processor 340 caches the raster images and current job structure data for the print job in memory 350 (530). These data are retained in memory 350 until output of the print job has been completed. The job data structure may be updated in response to changes to post-raster print settings received after the print job is later interrupted. Next, the raster images and the post-raster print settings are downloaded to print engine 360 and outputting of the print job begins (540). At that point, processor 340 awaits an interrupt indication. If an interrupt indication is received, processor 340 causes output of the print job to be temporarily suspended (550). At that point, processor 340 awaits a resume indication with or without print setting changes. If the resume indication is received without any print setting changes, processor 340 causes output of the print job to be resumed from where it left off (540). If, however, the resume indication is received with print setting changes, processor 340 causes the print job to be cancelled (560). Then, processor 340 updates the job data structure retained in memory 350 with the new post-raster print settings (530) and the print job is restarted (540) under the new post-raster print settings regime. At that point, processor 340 awaits a further interrupt indication, if any.

Figure 6:
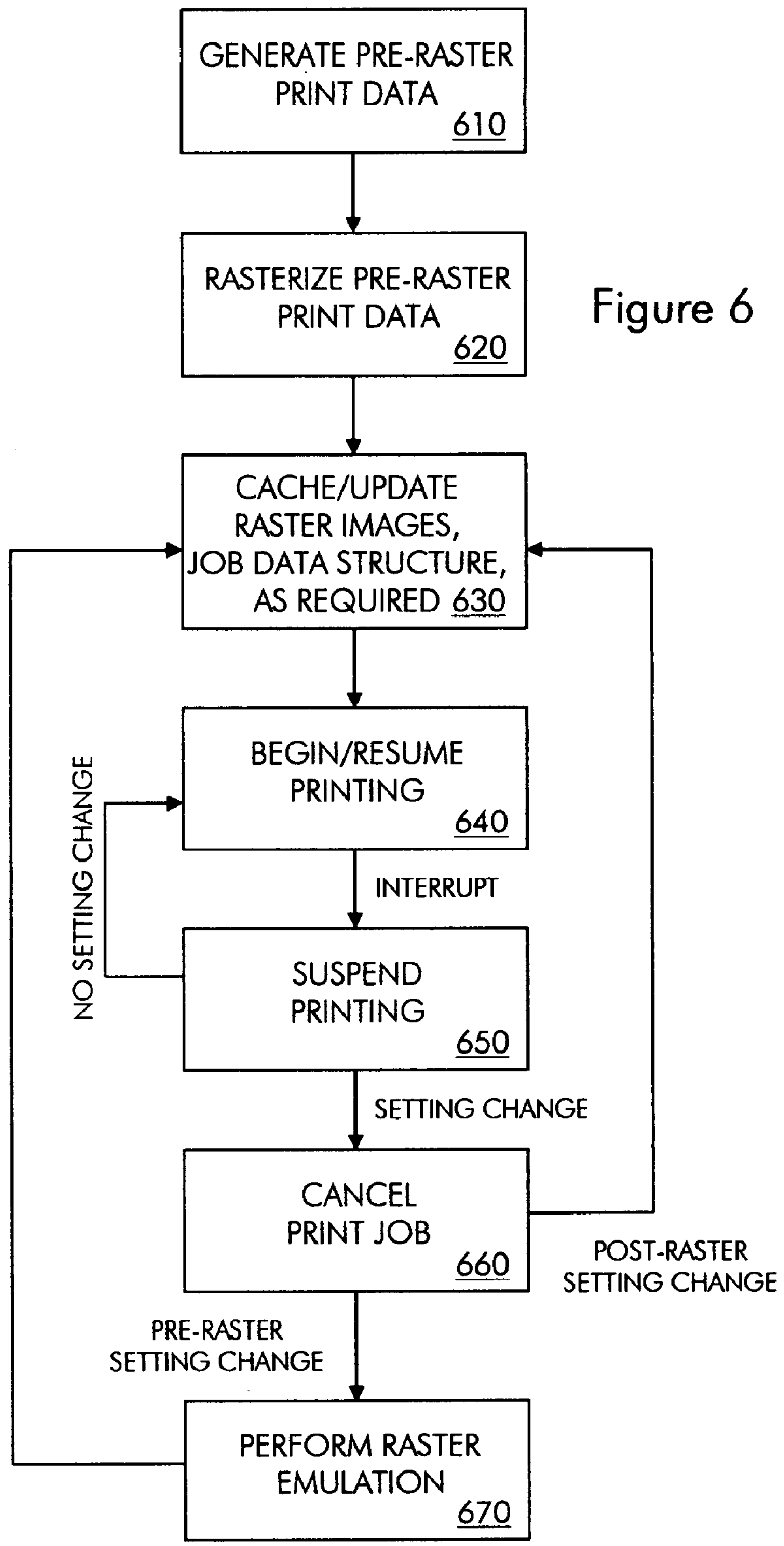
FIG. 6 shows an adaptive automatic printing method in which pre- and post-raster print settings may be changed in still other embodiments of the invention.

Finally, FIG. 6 shows an adaptive automatic printing method in which pre- and post-raster print settings may be changed in still other embodiments of the invention. In these embodiments, caching of pre-raster print data until the print job is completed and full re-rasterization are not required. Instead, raster emulation is employed to allow pre-raster print settings to be modified and raster images to be updated.

Upon receiving the print job, processor 340 performs a print data generation task (610) which, to the extent necessary, converts the source file for the print job into pre-raster print data in a format supported by printing node 130. The pre-raster print data may be PDL data, DL data or device independent bitmap data, for example, and also includes job structure data. The job structure data includes both pre-raster and post-raster print settings. Next, processor 340 performs an RIP task which applies the pre-raster print settings and converts the pre-raster print data into raster images (620). Next, processor 340 caches the raster images and current job structure data for the print job in memory 350 (630). These data are retained in memory 350 until output of the print job has been completed. The raster images may be updated through raster emulation in response to changes to pre-raster settings after the print job is later interrupted. The job data structure may be updated in response to changes to post-raster print settings received after the print job is later interrupted. Next, the raster images and the post-raster print settings are downloaded to print engine 360 and outputting of the print job begins (640). At that point, processor 340 awaits an interrupt indication. If an interrupt indication is received, processor 340 causes output of the print job to be temporarily suspended (650). At that point, processor 340 awaits a resume indication with or without print setting changes. If the resume indication is received without any print setting changes, processor 340 causes output of the print job to be resumed from where it left off (640).

If, however, the resume indication is received with print setting changes, processor 340 causes the print job to be cancelled (660). Then, processor 340 determines whether the print setting changes include one or more pre-raster setting changes. If not, raster emulation is not required. Processor 340 thus updates the job data structure retained in memory 350 with the new post-raster print settings (630) and the print job is restarted (640) under the new post-raster print settings regime. If, however, the print setting changes include one or more pre-raster setting changes, raster emulation is required. Processor 340 thus performs raster emulation (670) to update the raster images retained in memory 350.

In raster emulation, raster images in memory 350 are reverse-rasterized to an earlier bitmap state, but not all the way to a pre-raster print data format, to allow pre-raster setting changes to be implemented. Once the changes are implemented, the raster images are returned to a fully rasterized state. Examples of raster emulation include returning color space of a raster image to a device-independent color space and implementing a new color management setting, de-half-toning a raster image and implementing a new toner setting, converting pure black (K) in a raster image to composite black (CMY) and implementing a new UCR, and returning a raster image size from a physical size to a logical size and implementing new page scaling or page orientation.

If the print setting changes also include one or more post-raster setting changes, processor 340 also updates the job data structure retained in memory 350 with the new post-raster print settings (630). Then, processor 340 causes the print job to be restarted (640) with the modified raster images under the current print settings regime. At that point, processor 340 awaits a further interrupt indication, if any.

It will be appreciated by those of ordinary skill in the art that the invention can be embodied in other specific forms without departing from the spirit or essential character hereof. For example, while the described embodiments have involved a printing node, the invention can be applied to other imaging devices, such as fax machines and copy machines. Moreover, in some embodiments, the cached data are retained until output of the print job has been both completed and accepted, at which time these data are purged, and the raster images and/or job data structure may be updated in response to changes to print settings received at any time before the user has manifested acceptance of the completed print job by, for example, logging out of printing node 130. Furthermore, in some embodiments, if after an interrupt indication no resume indication is received within a specified time period, the print job is cancelled without restart. Thus, in these embodiments, the print job is restarted under the previous print settings regime in response to a resume indication within the specified time period unaccompanied by a change to a print job setting, is cancelled and restarted under the new print settings regime in response to a resume indication within the specified time period accompanied by a change to a print job setting, and is cancelled without restart in response to expiration of the specified time period without a resume indication.

The present description is therefore considered in all respects to be illustrative and not restrictive. The scope of the invention is indicated by the appended claims, and all changes that come with in the meaning and range of equivalents thereof are intended to be embraced therein.

What is claimed is:

1. A printing node, comprising:

a memory; and a processor communicatively coupled with the memory, wherein the printing node retains in the memory print data, a first raster image and a job data structure for a print job while the print job is being printed, wherein under control of the processor in response to a print setting change for the print job received after printing of the print job has started the printing node determines whether the print setting change can be implemented without re-rasterizing the print data, and wherein under control of the processor in response to determining that the print setting change cannot be implemented without re-rasterizing the print data the printing node performs raster emulation in conformance with the print setting change whereby an updated raster image is generated that replaces the first raster image, and restarts the print job in conformance with the print setting change.

2. The printing node of claim 1, wherein under control of the processor printing of the print job is temporarily suspended in response to an interrupt indication that precedes the print setting change.

3. The printing node of claim 1, wherein under control of the processor printing of the print job is canceled in response to the print setting change.

4. The printing node of claim 1, wherein the print setting change is inputted on a user interface of the printing node.

5. The printing node of claim 4, wherein the user interface displays a print settings menu.

6. The printing node of claim 1, wherein the raster emulation comprises reverse-rasterizing the first raster image to an earlier bitmap state but not all the way to a pre-raster print data format, making the print setting change to the first raster image in the earlier bitmap state and returning the first raster image in the earlier bitmap state to which the print setting change has been made to a fully rasterized state to generate the updated raster image.

7. The printing node of claim 1, wherein the raster emulation comprises returning a color space of the first raster image to a device-independent color space and making a color management setting change to the device-independent color space.

8. The printing node of claim 1, wherein the raster emulation comprises de-half-toning the first raster image and making a toner setting change to the de-half-toned raster image.

9. The printing node of claim 1, wherein the raster emulation comprises converting pure black in the first raster image to composite black and making an under color removal (UCR) setting change to the composite black.

10. The printing node of claim 1, wherein the raster emulation comprises returning the first raster image from a physical format to a logical format and making a page scaling setting change to the logical format.

11. The printing node of claim 1, wherein the raster emulation comprises returning the first raster image from a physical format to a logical format and making a page orientation setting change to the logical format.

* * * * *